(12) United States Patent
Tanda et al.

(10) Patent No.: US 7,553,335 B2
(45) Date of Patent: Jun. 30, 2009

(54) SCANNING PROBE MICROSCOPE PROBE AND MANUFACTURING METHOD THEREFOR, SCANNING PROBE MICROSCOPE AND USING METHOD THEREFOR, NEEDLE-LIKE BODY AND MANUFACTURING METHOD THEREFOR, ELECTRONIC DEVICE AND MANUFACTURING METHOD THEREFOR, CHARGE DENSITY WAVE QUANTUM PHASE MICROSCOPE, AND CHARGE DENSITY WAVE QUANTUM INTERFEROMETER

(75) Inventors: Satoshi Tanda, Hokkaido (JP); Migaku Oda, Hokkaido (JP); Katsuhiko Inagaki, Hokkaido (JP); Hiroyuki Ohkawa, Hokkaido (JP); Takeshi Toshima, Hokkaido (JP); Naoki Momono, Hokkaido (JP); Munehiro Nishida, Hokkaido (JP); Masayuki Ido, Hokkaido (JP)

(73) Assignee: Japan Science and Technology Agency, Saitama (JP)

( * ) Notice: Subject to any disclaimer, the term of this patent is extended or adjusted under 35 U.S.C. 154(b) by 317 days.

(21) Appl. No.: 11/568,223

(22) PCT Filed: Apr. 22, 2005

(86) PCT No.: PCT/JP2005/008259

§ 371 (c)(1), (2), (4) Date: Jan. 10, 2007

(87) PCT Pub. No.: WO2005/103646

PCT Pub. Date: Nov. 3, 2005

(65) Prior Publication Data

US 2007/0272855 A1 Nov. 29, 2007

(30) Foreign Application Priority Data

Apr. 23, 2004 (JP) .................. 2004-128770
Apr. 23, 2004 (JP) .................. 2004-128771
Apr. 23, 2004 (JP) .................. 2004-128772

(51) Int. Cl.
*G01N 13/10* (2006.01)

(52) U.S. Cl. ............... 850/59; 250/306; 250/307; 850/21; 850/52; 850/56

(58) Field of Classification Search ........... 250/306, 250/307; 850/21–26, 29–33, 40, 52, 56, 850/57, 59, 60; 977/540, 849, 860–868, 977/875, 878, 879

See application file for complete search history.

(56) References Cited

U.S. PATENT DOCUMENTS

2002/0117467 A1* 8/2002 Tanda et al. .................. 216/2

FOREIGN PATENT DOCUMENTS

| JP | 4-233406 | 8/1992 |
| JP | 2002-181682 | 6/2002 |
| JP | 2003-240700 | 8/2003 |

OTHER PUBLICATIONS

Ookawa et al., "TaS2, TaSe2 Denka Mitsudoha (CDW) ni yoru Sosagata Kenbikyo no Kaihatsu," Dai 51 Kai Oyo Butsurigaku Kankei Rengo Koenkai Koen Yokoshu, separate Vo. 2, Mar. 28, 2004, p. 744.

(Continued)

*Primary Examiner*—David A Vanore
*Assistant Examiner*—Michael Maskell
(74) *Attorney, Agent, or Firm*—K & L Gates LLP

(57) ABSTRACT

A scanning probe microscope probe is produced by depositing a raw-material film on the surface of a cone made of Si, etc. and growing a needle-like crystal by using the raw-material film by irradiating an energy beam to a point on the cone at a predetermined distance along the side surface from the cone tip under such conditions as not to melt the cone. Also, a charge density wave quantum phase microscope is provided which uses a probe made of a charge density wave crystal. Also, a charge density wave quantum interferometer is provided which uses the needle-like crystal formed from the charge density wave crystal. Also, the scanning probe microscope probe is formed from a pressure-induced superconducting substance.

2 Claims, 15 Drawing Sheets

OTHER PUBLICATIONS

Golberg, et al., "Nanotubes in boron nitride laser heated at high pressure," Applied Physics Letters, Sep. 30, 1996, vol. 69, No. 14, pp. 2045-2047.

Bonnet et al., "Needles of WO2.9 Grown in an Electron Microscope," Journal of Crystal Growth, 1982, vol. 56, No. 3, pp. 633-638.

Okajima et al., "Atarashii CDW Kanshokei ni okeru Hisenkei Denki Dendo no Kansoku," The Physical Society of Japan Koen Gaiyoshu, 1999 vol. 54, No. 2, (1999 Nen Aki no Bunkakai), separate vol. 4, p. 698.

Tanba et al., "Atarashii topology o Motsu Ring-jo oyobi Tube-jo CDW Busshitsu no Sosei," The Physical Society of Japan Koe Gaiyoshu, 1999, vol. 54, No. 2, seprate vol. 4, p. 776.

Adelman, "S.V. Zaitsev-Zotov, and R.E. Thorne, Field-Effect Modulation of Charge-Density-Wave Transport in NbSe3 and TaS3," Physical review Letter, Jun. 26, 1995, vol. 74,, No. 26, p. 5264-5267.

* cited by examiner

SCANNING PROBE MICROSCOPE PROBE AND MANUFACTURING METHOD THEREFOR, SCANNING PROBE MICROSCOPE AND USING METHOD THEREFOR, NEEDLE-LIKE BODY AND MANUFACTURING METHOD THEREFOR, ELECTRONIC DEVICE AND MANUFACTURING METHOD THEREFOR, CHARGE DENSITY WAVE QUANTUM PHASE MICROSCOPE, AND CHARGE DENSITY WAVE QUANTUM INTERFEROMETER

CROSS REFERENCE TO RELATED APPLICATIONS

The present application claims priority to Japanese Patent Document Nos. 2004-128770, 2004-128771 and 2004-128772 all of which were filed on Apr. 23, 2004, the disclosures of which are herein incorporated by reference.

BACKGROUND

The present invention relates to a scanning probe microscope probe and manufacturing method therefor, a scanning probe microscope and using method therefor, a needle-like body and manufacturing method therefor, an electronic device and manufacturing method therefor, a charge density wave quantum phase microscope, and a charge density wave quantum interferometer. The present invention is suitably usable for production of a novel device from a charge density wave nano-structure, determination of a biomolecular structure, surface inspection of various substances including superconducting ones, and a semiconductor device, etc.

It is only in three states, namely, in superconductivity, charge density wave (CDW) or quantum Hall liquid, that conduction electrons in an electric conductor such as a metal can be macroscopically quantum-coherent with each other. No exaggeration, the conduction electrons can be macroscopically quantum-coherent with each other only in two of the three states, namely, in the states of superconductivity and charge density wave (CDW), unless handled from outside. More specifically, since a CDW body shows a phase transition at room temperature, a device and measuring device, utilizing the CDW macroscopic quantum phase, are practically higher in potential than the semiconductor technology and have been attracting more and more attention. Recently, under such circumstances CDW three-terminal electric field/current driving device, femtosecond-speed memory device, etc. have been worked out and proved each as a new quantum functional device having a new effect (as in Appl. Phys. Lett. 80, 871 (2002), for example).

It is considered that for production of a device from a CDW nano-structure, a tool for evaluation of the device is indispensable. However, as far as the Inventors of the present invention know, any such effective tools have not yet been proposed exactly.

The scanning probe microscope (SPM) is an important tool for the nano-science and nano-technology, and is widely applied to surface inspection of various substances, development of materials and devices, etc.

On the other hand, recently, there have been studied the nano-scale nonuniform superconducting state (phenomenon of self-organization) taking place in the high-temperature superconductor and heavy electron system. It is already known that in a copper oxide high-temperature superconductor $La_{2-x}Ba_xCuO_4$ having x in the vicinity of ⅛, the spin/charge stripe order is stabilized at a low temperature and the system becomes insulative with the result the superconductivity will be inhibited (as in J. M. Tranquada et al., Nature Vol. 357 (1995) 561, for example). Also, it is known that when a small pressure is applied to the system, the spin/charge stripe order is inhibited, while the superconductivity is recovered (as in N. Yamada and M. Ido. Physica C Vol. 203 (1992) 240 and M. Ido et al., J. Low Temp. Phys. Vol. 105 (1996) 311, for example).

However, the conventional scanning probe microscope could not be any effective tool for studying the nano-scale nonuniform superconducting state. Therefore, there has been demanded a new tool, but any such effective tool has not yet been proposed.

SUMMARY

It is therefore an object of the present invention to provide a charge density wave quantum phase microscope usable to analyze a charge density wave nano-structure, determination of a biomolecular structure, etc. with a high precision by actively utilizing macroscopic quantum phase information on a charge density wave, and which can be designed smaller, a scanning probe microscope such as the charge density wave quantum phase microscope, a probe suitably usable in the scanning probe microscope, and a manufacturing method therefor.

Another object of the present invention is, more generally, to provide a variety of needle-like bodies including the above-mentioned scanning probe microscope probe and manufacturing methods therefor, and an electronic device and manufacturing method therefor.

The other object of the present invention is to provide a charge density wave quantum interferometer capable of measuring a local electric field with a high precision by actively utilizing macroscopic quantum phase information on a charge density wave.

Further object of the present invention is to provide a scanning probe microscope suitably usable for study of the nano-scale nonuniform superconducting state, observation of a flux-line lattice, study of the state of electrons within a magnetic flux, and observation of an image of specimen surface irregularities, and use of the scanning probe microscope.

The above and other objects will be apparent from the following description with reference to the accompanying drawings.

The Inventors of the present invention actively prepared a theoretically designed CDW nano-structure from the standpoint of the materials science, and tried to make clear external stimulus-caused changes in electrical, elastic and optical properties of the materials of the nano-structure with an intention to apply the nano-structure effectively in various fields of industry. The Inventors intended to develop a smaller, higher-performance microscope which can actively utilize the macroscopic quantum phase information on CDW. Such a microscope is an indispensable tool for production of a device from a CDW nano-structure, and also it will be much contributed to determination of a biomolecular structure represented by DNA, development of a quantum computer that uses quantum phase information, etc.

CDW is normally pinned under the influence of impurities and specimen end. When applied with an electric field larger than a threshold field, however, CDW will slide and contribute to electric conduction. The CDW sliding is a collective translation of electrons, which is a characteristic phenomenon of low-order conductors. When CDW slides through a pinning potential, there will develop an AC current having a frequency proportional to a DC current component carried by CDW, that is, a narrow-band signal (NBS) (also called "narrow-band noise (NBN)"). On the consumption that an excess current portion flowing when an electric field larger than the threshold one is applied is $J_{CDW}$ and the frequency of NBS is $v_{NBS}$, $v_{NBS} \propto J_{CDW}$. Therefore, a change in threshold electric field can be determined with a high precision through measurement of the frequency $v_{NBS}$ of NBS. Since the threshold electric field is changed by a slight stress developed in a CDW crystal, just connecting electrodes to a CDW needle to measure NBS can provide a high-precision microscope higher in functionality than an atomic force microscope (AFM). For example, use of a 100 nm-long CDW needle-like crystal makes it possible to provide a microscope having an optical resolution of 1 pm with the sensitivity of a frequency meter used being 1 Hz. In AFM, a shift of a probe of a cantilever is detected by irradiating the cantilever with laser light. However, since the above CDW microscope requires no such an optical system, so it can be designed very small. Thus, the CDW microscope is largely advantageous because it can be introduced directly into a living body like a syringe.

Also, in a high-purity, micro CDW needle-like crystal, whether the pinning forces at both ends of the specimen increase or decrease each other depends upon the wavelength $\lambda_{CDW}$ of CDW and specimen length. As the wavelength $\lambda_{CDW}$ is changed due to application of a gate voltage to the CDW needle-like crystal, the threshold field will oscillate, which is quite the same behavior as that of a superconducting quantum interferometer (SQUID) and thus implements a quantum interferometer for measuring a voltage. The detection of a change in threshold electric field through measurement of NBS makes it possible to provide a high-precision microscope that can measure a local electric field (charge).

On the other hand, the Inventors made a variety of experiments for growing a needle-like crystal at the tip of a cone formed from Si, for example, by using irradiation of an energy beam such as an electron beam, and found the fact that even if the energy beam is irradiated to the tip of a cone having a raw material deposited on the surface thereof, it is difficult to grow a needle-like crystal at the cone tip, while irradiation of the energy beam to a point, apart from the tip, of the cone permits to easily grow a needle-like crystal at the cone tip. Also, the Inventors found that selective irradiation of an energy beam such as an electron beam to the surface of a substrate to recrystallize the beam-irradiated point of the substrate permits to grow a needle-like crystal in a form in which the substrate and crystal are contiguous to each other. Growing a CDW needle-like crystal with these techniques and using the needle-like crystal as a probe make it possible to provide a CDW probe microscope. Also, growing a needle-like crystal of any other material and using the needle-like crystal as a probe permit to implement various types of scanning probe microscopes. Further, growing a needle-like semiconductor crystal, for example, by these methods permits to provide a micro semiconductor device.

Moreover, the Inventors found that for implementation of an effective tool for study of the nano-scale nonuniform superconducting state, it is effective to use, as a scanning probe microscope probe, a pressure-induced superconducting substance having superconductivity susceptive to a pressure and whose superconducting state can thus be controlled by applying a small pressure.

The present invention was worked out based on the above Inventors findings.

According to a first aspect of the present invention, there is provided a scanning probe microscope probe, produced by depositing a raw material on the surface of a cone- or blade-shaped substrate and growing a needle-like crystal by using the raw material by irradiating an energy beam to a point on the substrate at a predetermined distance along the side surface from the substrate tip under such conditions as not to melt the substrate.

Also, according to a second aspect of the present invention, there is provided a manufacturing method for a scanning probe microscope probe, wherein a raw material is deposited on the surface of a cone- or blade-shaped substrate and a needle crystal is grown by using the raw material by irradiating an energy beam to a point on the substrate at a predetermined distance along the side surface from the substrate tip under such conditions as not to melt the substrate.

Also, according to a third aspect of the present invention, there is provided a scanning probe microscope including a probe produced by depositing a raw material on the surface of a cone- or blade-shaped substrate and growing a needle-like crystal by using the raw material by irradiating an energy beam to a point on the substrate at a predetermined distance along the side surface from the substrate tip under such conditions as not to melt the substrate.

Also, according to a fourth aspect of the present invention, there is provided a scanning probe microscope probe, produced by supplying a raw material to the surface of a cone- or blade-shaped substrate and growing a needle-like crystal by using the raw material by irradiating an energy beam to a point on the substrate at a predetermined distance along the side surface from the substrate tip under such conditions as not to melt the substrate.

Also, according to a fifth aspect of the present invention, there is provided a manufacturing method for a scanning probe microscope probe, wherein a raw material is supplied to the surface of a cone- or blade-shaped substrate and a needle-like crystal is grown by using the raw material by irradiating an energy beam to a point on the substrate at a predetermined distance along the side surface from the substrate tip under such conditions as not to melt the substrate.

Also, according to a sixth aspect of the present invention, there is provided a scanning probe microscope including a probe produced by supplying a raw material to the surface of a cone- or blade-shaped substrate and growing a needle-like crystal by using the raw material by irradiating an energy beam to a point on the substrate at a predetermined distance along the side surface from the substrate tip under such conditions as not to melt the substrate.

Also, according to a seventh aspect of the present invention, there is provided a scanning probe microscope probe, produced by depositing a first raw material on the surface of a cone- or blade-shaped substrate, supplying a second raw material to the surface and growing a needle-like crystal by using the first and second raw materials by irradiating an energy beam to a point on the substrate at a predetermined distance along the side surface from the substrate tip under such conditions as not to melt the substrate.

Also, according to an eighth aspect of the present invention, there is provided a manufacturing method for a scanning probe microscope probe, wherein a first raw material is deposited on the surface of a cone- or blade-shaped substrate, a second raw material is supplied to the surface and a needle-like crystal is grown by using the first and second raw materials by irradiating an energy beam to a point on the substrate at a predetermined distance along the side surface from the substrate tip under such conditions as not to melt the substrate.

Also, according to a ninth aspect of the present invention, there is provided a scanning probe microscope including a probe produced by depositing a first raw material on the surface of a cone- or blade-shaped substrate, supplying a second raw material to the surface and growing a needle-like crystal by using the first and second raw materials by irradiating an energy beam to a point on the substrate at a predetermined distance along the side surface from the substrate tip under such conditions as not to melt the substrate.

The above first to ninth aspects of the present invention uses a substrate formed from a material whose melting point is so high that it will not be softened when irradiated with an energy beam, for example, 800° C. or higher. The substrate may have a triangular pyramid shape or quadrangular pyramid shape in addition to the circular cone shape. Namely, its sectional area has only to be smaller toward the tip. The energy beam may be, for example, an electron beam, ion beam or laser beam. The laser beam may be laser beam generated by excimer laser, YAG laser, Ar laser or the like. The sectional shape of the energy beam is not limited to any special one but it may be circular, elliptic or rectangular. In case the substrate has a plurality of conical portions, the energy beam should have a flat rectangular sectional shape. By irradiating the energy beam over the plurality of conical portions, needle-like crystals can collectively be grown on the conical portions. An energy beam having such a flat rectangular sectional shape can easily be obtained by shaping a laser beam through an optical system including a lens, etc. The raw material can be deposited or supplied by any of the deposition methods such as the vacuum evaporation, sputtering, chemical vapor deposition (CVD), metalorganic chemical vapor deposition (MOCVD), molecular beam epitaxy (MBE) and the like or by an appropriate combination of them. When the laser beam is irradiated, generally, between an energy beam-irradiated point and tip of the substrate tip, there is a temperature gradient of above 10° C./μm and below 100° C./μm, starting at the substrate tip (at the lowest temperature). The thickness of the needle-like crystal is determined as necessary, but it is generally above 5 nm and below 1 μm. The needle-like crystal should preferably be grown in vacuum or in hydrogen gas in order to prevent oxidation.

In case the scanning probe microscope is, for example, a charge density wave quantum phase microscope, the needle-like crystal is formed from $MX_p$ (where M is at least one element selected from a group of Ta and Nb, X is at least one element selected from a group of S, Se and Te, and $1.8 \leq p \leq 2.2$), $MX_q$ (where M is at least one element selected from a group of Ta and Nb, X is at least one element selected from a group of S, Se and Te, and $2.7 \leq q \leq 3.3$) or $MX_r$ (where M is at least one element selected from a group of Ta and Nb, X is at least one element selected from a group of S, Se and Te, and $3.6 \leq r \leq 4.4$). More specifically, $MX_p$ is $TaSe_2$ or $TaS_2$, $MX_q$ is $NbSe_3$ or $NbS_3$, and $MX_r$ is $NbTe_4$ or the like. The needle-like crystal may be of a metal such as Ni or Cu or a superconducting material (oxide superconductor or the like).

Also, according to a tenth aspect of the present invention, there is provided a manufacturing method for a needle-like body, wherein a raw material is deposited on the surface of a cone- or blade-shaped substrate and a needle-like crystal is grown by using the raw material by irradiating an energy beam to a point on the substrate at a predetermined distance along the side surface from the substrate tip under such conditions as not to melt the substrate.

Also, according to an eleventh aspect of the present invention, there is provided a manufacturing method for a needle-like body, wherein a raw material is supplied to the surface of a cone- or blade-shaped substrate and a needle-like crystal is grown by using the raw material by irradiating an energy beam to a point on the substrate at a predetermined distance along the side surface from the substrate tip under such conditions as not to melt the substrate.

Also, according to a twelfth aspect of the present invention, there is provided a manufacturing method for a needle-like body, wherein a first raw material is deposited on the surface of a cone- or blade-shaped substrate, a second raw material is supplied to the surface and a needle-like crystal is grown by using the first and second raw materials by irradiating an energy beam to a point on the substrate at a predetermined distance along the side surface from the substrate tip under such conditions as not to melt the substrate.

In the above tenth to twelfth aspects of the present invention, the needle-like bodies may include a needle-like crystal used to form the scanning probe microscope probe and needle-like crystals for other applications, and the needle-like crystal may be formed from any of various materials.

The description made above of the first to ninth aspects is also true of the tenth to twelfth aspects unless it is contrary to the nature of the latter ones.

Also, according to a thirteenth aspect of the present invention, there is provided a manufacturing method for an electronic device, wherein a raw material is deposited on the surface of a cone- or blade-shaped substrate and a needle-like crystal is grown by using the raw material by irradiating an energy beam to a point on the substrate at a predetermined distance along the side surface from the substrate tip under such conditions as not to melt the substrate.

Also, according to a fourteenth aspect of the present invention, there is provided a manufacturing method for an electronic device, wherein a raw material is supplied to the surface of a cone- or blade-shaped substrate and a needle-like crystal is grown by using the raw material by irradiating an energy beam to a point on the substrate at a predetermined distance along the side surface from the substrate tip under such conditions as not to melt the substrate.

Also, according to a fifteenth aspect of the present invention, there is provided a manufacturing method for an electronic device, wherein a first raw material is deposited on the surface of a cone- or blade-shaped substrate, a second raw material is supplied to the surface and a needle-like crystal is grown by using the first and second raw materials by irradiating an energy beam to a point on the substrate at a predetermined distance along the side surface from the substrate tip under such conditions as not to melt the substrate.

In the above thirteenth to fifteenth aspects of the present invention, the electronic devices include various ones such as a semiconductor device as well as a superconducting device, ferroelectric device, magnetic device, etc.

The description made above of the first to ninth aspects is also true of the thirteenth to fifteenth aspects unless it is contrary to the nature of the latter ones.

Also, according to a sixteenth aspect of the present invention, there is provided a scanning probe microscope probe produced by irradiating an energy beam to a predetermined point on the surface of a substrate to recrystallize the energy beam-irradiated point for growing a needle-like crystal.

Also, according to a seventeenth aspect of the present invention, there is provided a manufacturing method for a scanning probe microscope probe, wherein an energy beam is irradiated to a predetermined point on the surface of a substrate to recrystallize the energy beam-irradiated point for growing a needle-like crystal.

Also, according to an eighteenth aspect of the present invention, there is provided a scanning probe microscope including a probe produced by irradiating an energy beam to a predetermined point on the surface of a substrate to recrystallize the energy beam-irradiated point for growing a needle-like crystal.

Also, according to a nineteenth aspect of the present invention, there is provided a manufacturing method for a needle-like body, wherein an energy beam is irradiated to a predetermined point on the surface of a substrate to recrystallize the energy beam-irradiated point for growing a needle-like crystal.

Also, according to a twentieth aspect of the present invention, there is provided a manufacturing method for an electronic device, wherein an energy beam is irradiated to a predetermined point on the surface of a substrate to recrystallize the energy beam-irradiated point for growing a needle-like crystal.

The description made above of the first to fifteenth aspects is also true of the sixteenth to twentieth aspects unless it is contrary to the nature of the latter ones.

In the first to fifteenth aspects constructed as above, the needle-like crystal is grown on the tip of the substrate by irradiating the energy beam to a point on the substrate at a predetermined distance from the substrate tip.

Also in the sixteenth to twentieth aspects, the needle-like crystal is grown by irradiating the energy beam to a predetermined point on the substrate surface.

Also, according to a twenty-first aspect of the present invention, there is provided a charge density wave quantum phase microscope using a probe formed from a charge density wave crystal and wherein a change in threshold electric field of the charge density wave crystal, caused when the probe is brought into contact with a specimen, is measured through measurement of the frequency of a narrow band signal.

In the above twenty-first aspect, a change in threshold electric field of the charge density wave crystal, caused when the probe formed from the charge density wave crystal is brought into contact with a specimen, is measured through measurement of the frequency of a narrow band signal (NBS).

Otherwise, the charge density wave state of the specimen can also be measured by utilizing a charge density wave tunneling developed between the probe and specimen when the probe has been brought closer to the specimen.

Also, according to a twenty-second aspect of the present invention, there is provided a charge density wave quantum interferometer using a needle-like crystal formed from a charge density wave crystal.

Typically in the above twenty-second aspect, a change in threshold electric field, caused when a gate voltage is applied to the side surface of the needle-like crystal, is measured through measurement of the frequency of a narrow band signal.

Basically, the above twenty-first and -second aspects may use any charge density wave crystal. Preferably, however, the charge density wave crystal should be from $MX_p$ (where M is at least one element selected from a group of Ta and Nb, X is at least one element selected from a group of S, Se and Te, and $1.8 \leq p \leq 2.2$), $MX_q$ (where M is at least one element selected from a group of Ta and Nb, X is at least one element selected from a group of S, Se and Te, and $2.7 \leq q \leq 3.3$) or $MX_r$ (where M is at least one element selected from a group of Ta and Nb, X is at least one element selected from a group of S, Se and Te, and $3.6 \leq r \leq 4.4$). More specifically, $MX_p$ is $TaSe_2$ or $TaS_2$, $MX_q$ is $NbSe_3$ or $NbS_3$, and $MX_r$ is $NbTe_4$ or the like.

The charge density wave crystal is typically a needle-like crystal. The charge density wave crystal or needle-like crystal includes a tubular crystal such as a nano-tube as well. It is not limited to a single crystal but it may be a polycrystal.

With the twenty-first aspect constructed as above, it is possible to precisely measure a change in threshold electric field of a charge density wave due to a stress developed in the charge density wave crystal probe having been brought into contact with the surface of a specimen through measurement of the frequency of an arrow band signal. Otherwise, the state of charge density wave of the specimen can be measured by utilizing the charge density wave tunneling developed between the probe and the surface of the specimen when the probe is brought closer to the specimen surface. Also, this twenty-first aspect needs not any optical system an AFM needs for detection of a displacement of a probe.

Also, with the twenty-second aspect, it is possible to precisely measure a change in threshold electric field of the charge density wave, developed when the needle-like crystal formed from the charge density wave crystal is applied with a gate voltage through measurement of the frequency of a narrow band signal.

Also, according to a twenty-third aspect of the present invention, there is provided a scanning probe microscope using a probe formed from a pressure-induced superconducting substance.

This aspect may use various types of pressure-induced superconducting substances. The pressure-induced superconducting substance is not limited to any inorganic type but may be of an organic type. Namely, an appropriate one of such pressure-induced superconducting substances may be selected based on an intended application. A most typical one of them is $La_{2-x}Ba_xCuO_4$ (abbreviated to "LBCO") as a copper oxide high-temperature superconductor, especially, the one in which the Ba concentration x is approximately ⅛ (typically, $x=⅛±0.03$). In LBCO of which the Ba concentration $x=$approximately ⅛, the spin/charge stripe order is stabilized at a low temperature, the system becomes insulative and the superconductivity is inhibited. On the other hand, when a small pressure is applied to the system, the spin/charge stripe order is inhibited while the superconductivity is recovered. The pressure-induced superconducting substances include also $La_{2-x-y}R_yBa_xCuO_4$ (abbreviated to "LRBCO" where R is a rare earth element such as Nd) which is a related substance of $La_{2-x}Ba_xCuO_4$, especially, the one in which x is approximately ⅛ and $0 \leq y <$approximately 0.5 (typically, $0 \leq y < 0.5$). The pressure-induced superconducting substances further include a low-order electronic system material such as $NbSe_3$, heavy electron-system material such as $CeTIn_5$ (T=Rh, Ir, Co), ferromagnetic metal such as Fe, etc.

The probe made of a pressure-induced superconducting substance is typically formed from a needle-like crystal (including a tubular crystal such as nano-tube).

When the probe made of the pressure-induced superconducting substance is brought into contact with the surface of a specimen, the tip of the probe is applied with a pressure, and the pressure causes the probe tip to be superconducting state so that the current (I)-voltage (V) characteristic between the probe and specimen will be changed. The I-V characteristic is changed due to the Andreev reflection taking place at the boundary between the superconductor and normal conductor. The Andreev reflection is such that since an electron (hole) incident from inside the normal conductor invades as a Cooper pair the superconductor, a hole (electron) in the same phase comes back. The change in I-V characteristic can be used to make various measurements or observations.

Also, according to a twenty-fourth aspect of the present invention, there is provided a using method for a scanning probe microscope using a probe made of a pressure-induced superconducting material, wherein the probe is scanned along the surface of a specimen while a constant current is being supplied between the probe and specimen.

In this aspect, when the probe is scanned along the specimen surface while the constant current is being supplied between the probe made of the pressure-induced superconducting material and the specimen, the irregularities of the specimen surface will cause the probe tip to change between the normal conducting state and the superconducting state and the voltage between the probe and specimen will thus be changed and the current-voltage characteristic between the probe and specimen will be changed. Imaging the change permits to view the irregularities of the specimen surface. Especially, in case the specimen is a superconducting material, when a mixture of superconducting and non-superconducting regions exists on the specimen surface, for example, when a flux line invades the superconducting specimen, the current-voltage characteristic between the probe and specimen will vary depending upon whether the probe formed from the pressure-induced superconducting material exists on the superconducting region or in the non-superconducting region. Therefore, with the twenty-fourth aspect, it is possible to observe flux-line lattice and the superconductivity and non-superconductivity nonuniform states. Also, it is possible to measure the mobility of carriers in the specimen.

Also, according to a twenty-fifth aspect of the present invention, there is provided a using method for a scanning probe microscope using a probe made of a pressure-induced superconducting material, wherein the probe is scanned along the surface of a specimen while the height of the probe is being changed to keep constant the voltage between the probe and specimen.

In the above aspect, the irregularities of the specimen surface can be viewed by imaging the change of the probe height.

The description made above of the twenty-third aspect is also true of the twenty-fourth and -fifth aspects unless it is contrary to the nature of the latter ones.

With the twenty-third to fifth aspects constructed as above, it is possible to easily observe, with the utilization of the Andreev reflection, for example, the state of a superconducting specimen, in which a nano-scale nonuniform superconducting state, flux-line lattice or the like exists, by scanning the probe made of the pressure-induced superconducting substance along the surface of the specimen while a constant current is supplied between the probe and specimen. Also, it is similarly possible to easily view an image of the irregularities on the specimen surface. Further, with utilization of both the above, it is possible to precisely image the flux-line lattice by removing the irregularities of the specimen surface.

Additional features and advantages of the present invention are described in, and will be apparent from, the following Detailed Description and the Figures.

DETAILED DESCRIPTION

The present invention will be explained in detail below concerning the embodiments thereof with reference to the accompanying drawings.

Figure 1:
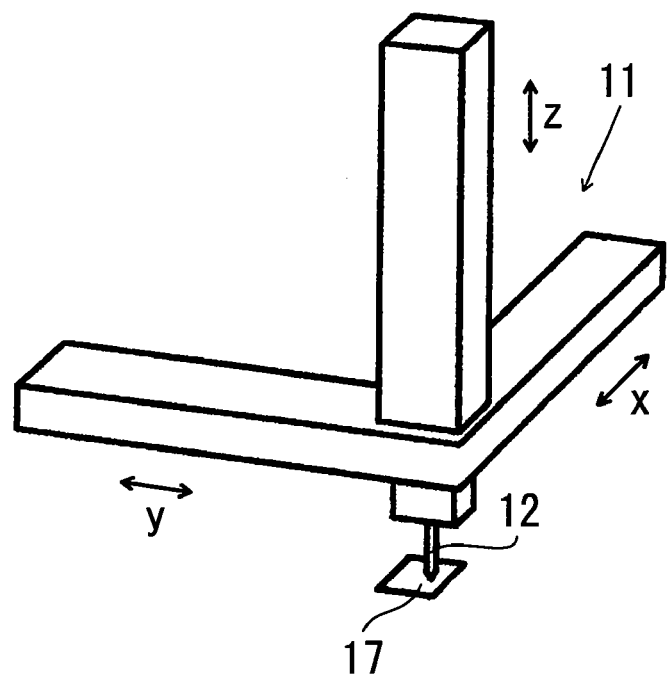
FIG. 1 schematically illustrates a CDW quantum phase microscope as a first embodiment of the present invention.

Referring now to FIG. 1, there is schematically illustrated the CDW quantum phase microscope as the first embodiment of the present invention.

Figure 2:
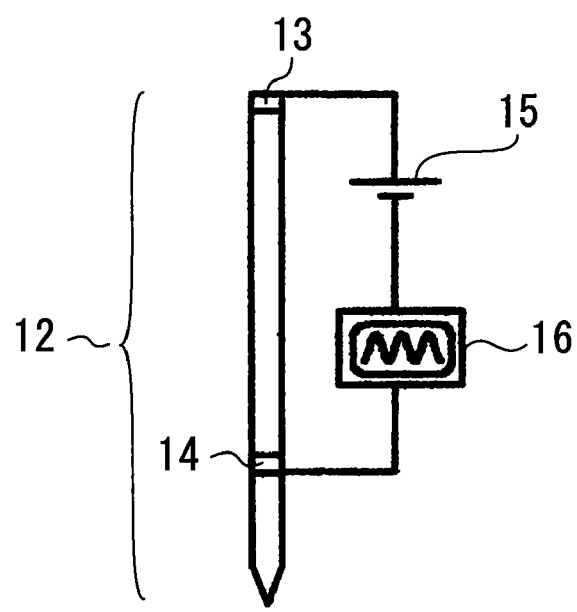
FIG. 2 schematically illustrates the probe used in the CDW quantum phase microscope as the first embodiment of the present invention.

As shown in FIG. 1, the CDW quantum phase microscope includes a piezoelectric controller 11 similar to that adopted in ordinary scanning probe microscopes, and a CDW needle-like crystal-made probe 12 so installed under the piezoelectric controller 11 that it can be scanned three-dimensionally in the x-, y- and z-directions by the piezoelectric controller 11. As shown in FIG. 2, the probe 12 includes electrodes 13 and 14 between which there is connected an external circuit including a power source 15 and frequency meter 16. The frequency of NBS can be measured by the frequency meter 16 to measure a change in threshold electric field.

The above CDW quantum phase microscope is to be used as will be discussed below. It should be noted here that the microscope is used to inspect a specimen made of a CDW nano-structure as an example.

The probe 12 is scanned while being kept in contact with the surface of a specimen 17 made of the CDW nano-structure as shown in FIG. 1. When the probe 12 is brought into contact with the surface of the specimen 17, the tip of the probe 12 is displaced, which causes a stress in the probe 12. The stress will cause the threshold electric field of the probe 12 to change, and the change in threshold electric field will cause the frequency of NBS flowing through the probe 12 to change. The change of the NBS frequency is converted into a surface image. The conversion into a surface image, in other words, visualization of a surface shape of an object, may be made through visualization of the output of a frequency-voltage (current) converter or visualization of a control signal providing a feedback.

Figure 3:
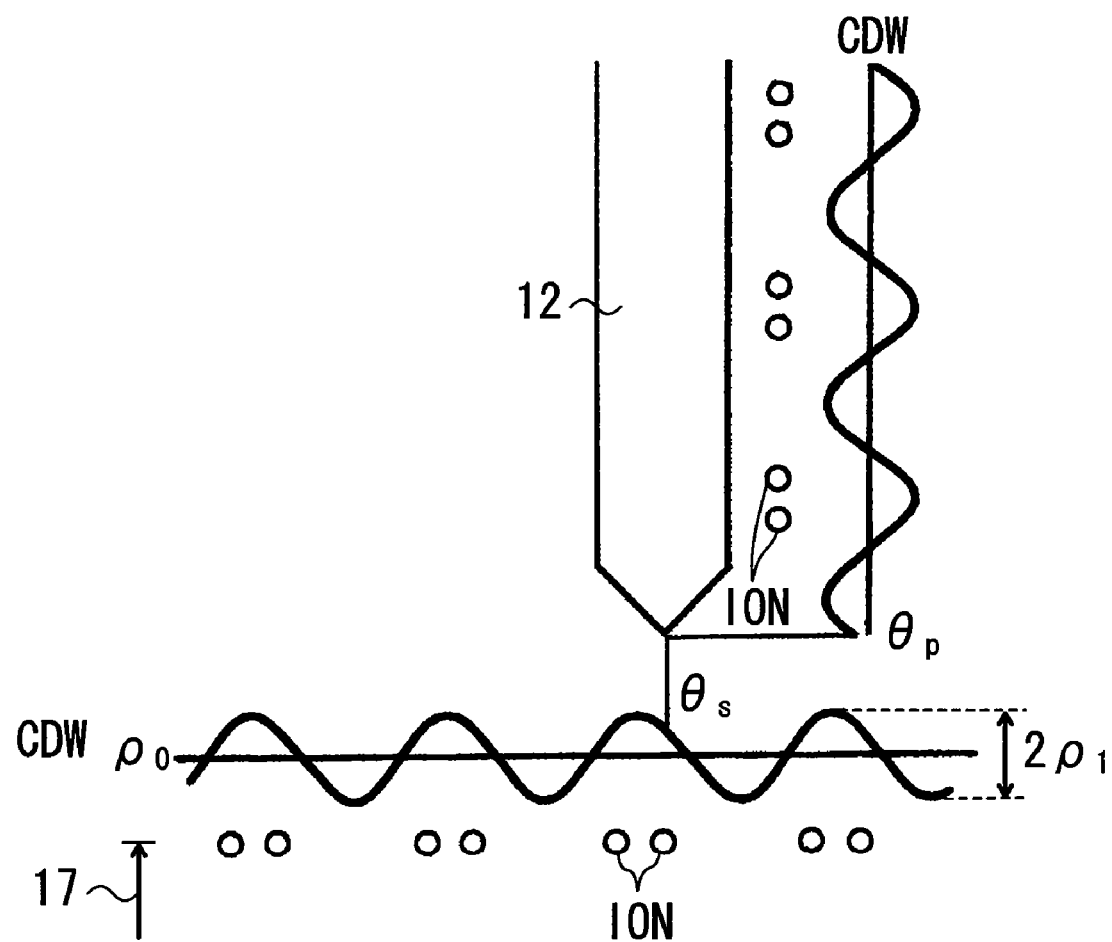
FIG. 3 explains the theory of measurement by the CDW quantum phase microscope as the first embodiment of the present invention.

The CDW quantum phase microscope may be used in another way as will be described below:

FIG. 3 shows an ion disposition and CDW (charge density $\rho(x)$) in a CDW state of the specimen 17 and an ion disposition and CDW of the probe 12. $\rho(x)$ may be expressed as follows:

$$\rho(x) = \rho_0 + \rho_1 \cos(Qx + \phi)$$

where x is a one-dimensional axial space coordinate, $\rho_1$ is the amplitude of the charge density wave, Q is a wave number vector (nesting vector) ($Q = 2k_F$ ($k_F$ is Fermi wave number), $\rho_0 = -en_e$ ($n_e$ is an electron density) and $\phi$ is a phase.

On the assumption that the phase of CDW at the tip of the probe 12 is $\theta_p$ and the phase of CDW on the surface of the specimen 17 is $\theta_s$ when the probe 12 is in contact with the specimen 17, there will hold a relation $\theta_p - \theta_s \propto V_{th}$ (where $V_{th}$ is a threshold voltage corresponding to a threshold electric field). When the tip of the probe 12 is displaced as the probe 12 is scanned, $\theta_s$ will correspondingly change, which results in a change of $\theta_p - \theta_s$, so that $V_{th}$, therefore, the threshold electric field will change. This change will be measured as a change in frequency of NBS.

The CDW quantum phase microscope may be used in still another way as will be described below. It should be noted that the CDW tunneling is utilized in this use of the CDW quantum phase microscope.

The probe 12 is scanned over the surface of the specimen 17 made of the CDW nano-structure while being brought closer to the surface. It is assumed here that the phase of CDW at the tip of the probe 12 is $\theta_p$ and the phase of CDW on the surface of the specimen 17 is $\theta_s$. When the tip of the probe 12 is displaced as it is scanned, $\theta_s$ will correspondingly change, resulting in a change of $\theta_p - \theta_s$, so that the tunneling current flowing between the probe 12 and specimen 17 will change. A change of this current or voltage is converted into a surface image.

Figure 4:
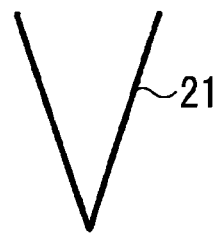
FIGS. 4A to 4D explain the manufacturing method for the probe used in the CDW quantum phase microscope as the first embodiment of the present invention.
Figure 4:
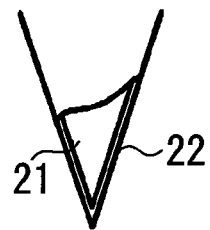
Figure 4:
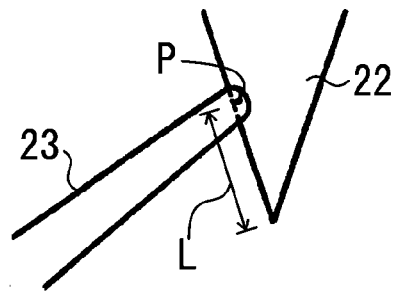
Figure 4:
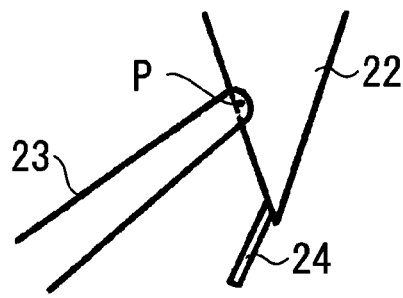

The probe 12 made of a CDW needle-like crystal is produced as will be described below:

First, a cone 21 is prepared as shown in FIG. 4A. Basically, the cone 21 may be formed from any material having a melting point at which the cone 21 heated by irradiating an electron beam to grow the CDW substance as will be described later will not be softened, for example, a melting point of 800° C. or higher. More specifically, the cone 21 may be formed from Si, $Si_3N_4$, $SiO_2$, diamond, alumina (sapphire), $TaS_2$, GaAs, Ni, Ta or the like.

Next, a raw-material film 22 for a CDW substance which is to be grown is formed on the surface of the cone 21 in vacuum as shown in FIG. 4B. In case $TaSe_2$ is used as the CDW substance, the raw-material film 22 may be a double layer consisting of Ta and Se films or a film of $TaSe_2$ itself. The raw-material film 22 may be formed by any one of the deposition methods such as the vacuum evaporation, sputtering, chemical vapor deposition (CVD), metalorganic chemical vapor deposition (MOCVD), molecular beam epitaxy (MBE) and the like or by an appropriate combination of them.

Next, an electron beam 23 is irradiated at room temperature toward a point P on the cone 21 at a predetermined distance L (for example, about 1 to 3 µm) along the side surface of the cone 21 from the tip of the cone 21 having the raw-material film 22 formed thereon as shown in FIG. 4C. The spot size of the electron beam 23 is, for example, about 50 nm to 1 µm. A CDW needle-like crystal 24 grows in the vicinity of the tip of the cone 21, not at a point irradiated with the electron beam 23, as shown in FIG. 4D. Normally, when the electron beam 23 is irradiated, a temperature gradient of 10 to 100° C./µm starting at the cone tip (at the lowest temperature) takes place between the point irradiated with the electron beam 23 and point where the CDW needle-like crystal 24 grows. In this case, the temperature of the point irradiated with the electron beam 23 is higher than the growth temperature of the CDW needle-like crystal 24, but the point where the CDW needle-like crystal 24 grows has an optimum temperature for the growth of the CDW needle-like crystal 24. It is considered that the CDW needle-like crystal 24 is grown due to the solid-phase epitaxial growth. The CDW needle-like crystal 24 is, for example, about 5 nm to 1 µm in thickness (diameter), 10 nm to 2 µm or 10 to 500 nm in length, and 100 or less in aspect ratio (length/thickness) as a rule.

EXAMPLE 1

Figure 5:
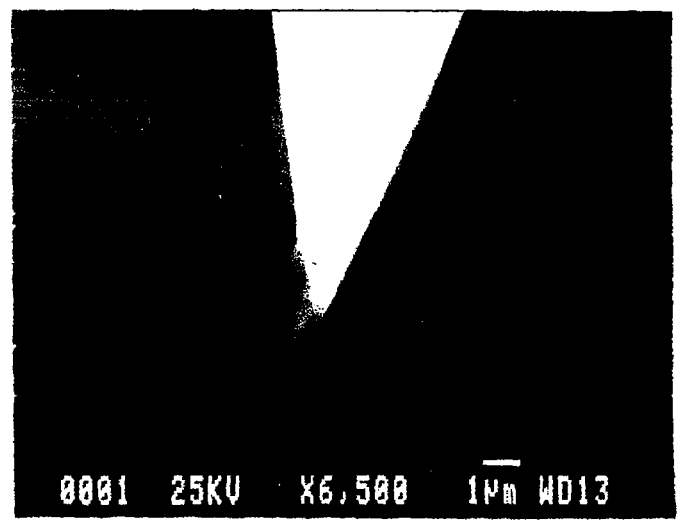
FIG. 5 is an SEM micrograph showing the probe manufactured by the manufacturing method for the probe used in the CDW quantum phase microscope as the first embodiment of the present invention.

After the Ta and Se films were formed one after another by the vacuum evaporation on the surface of the cone 21 made of Si, the electron beam 23 was irradiated to a point on the cone 21 at a distance of L=2 µm along the surface from the tip of the cone 21 having the raw-material film 22 formed from the Ta and Se films. The Ta film was 100 nm in thickness and Se film was 200 nm in thickness. The spot size of the electron beam 23 was 1 µm, acceleration voltage was 25 kV, irradiation current amount was $1 \times 10^{-7}$ µA and irradiation time was 30 min. Also, the electron beam 23 was irradiated in a vacuum of 3 to $4 \times 10^{-6}$ Torr. As a result, a needle-like crystal of $TaSe_2$ was grown to a diameter of about 0.4 µm and length of about 1.5 µm at a point at a distance of about 0.5 µm from the cone tip. FIG. 5 is a scanning electron microscope (SEM) micrograph of the needle-like crystal. In this case, it is considered that the point on the cone 21, irradiated with the electron beam 23, had a temperature of about 800 to 850° C. and the needle-like crystal having thus grown had a temperature of about 600 to 700° C.

Figure 6:
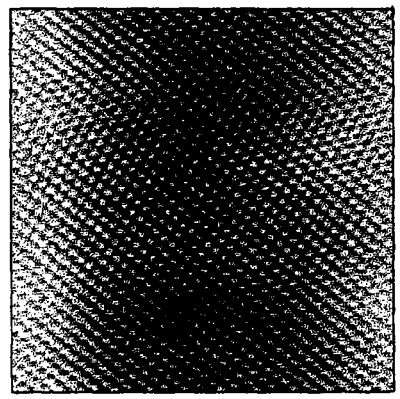
FIG. 6 is a micrograph of an atomic image obtained by the CDW quantum phase microscope as the first embodiment of the present invention.

The surface of the $TaSe_2$ specimen was scanned by using the needle-like crystal of $TaSe_2$ as the probe 12. FIG. 6 is a micrograph showing an excellent atomic image obtained.

Figure 7:
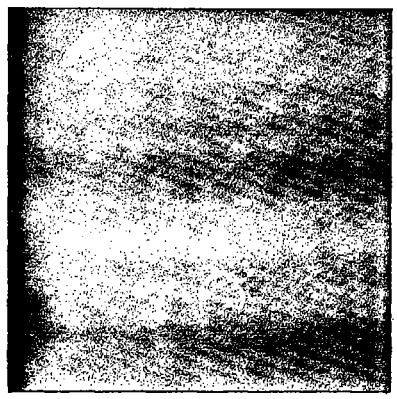
FIG. 7 is a micrograph of a CDW image obtained by the CDW quantum phase microscope as the first embodiment of the present invention.

Next, the surface of the $TaSe_2$ specimen was scanned by a CDW quantum phase microscope using the probe 12 composed of the $TaSe_2$ needle-like crystal and electrodes 13 and 14 formed on the crystal. FIG. 7 is a micrograph of a CDW image obtained by the CDW quantum phase microscope.

According to the first embodiment, there can be implemented a CDW quantum phase microscope which actively utilizes macroscopic quantum phase information on CDW. The CDW quantum phase microscope is a high-precision one higher in functionality than AFM. For example, use of a 100 nm-long CDW probe 12 permits to implement a microscope having a resolution of 1 pm with the sensitivity of a frequency meter 16 used being 1 Hz. Also, since this CDW quantum phase microscope needs not any optical system used in AFM or the like, it can advantageously be designed correspondingly smaller.

Next, there will be explained the CDW quantum phase microscope as the second embodiment of the present invention.

Figure 8:
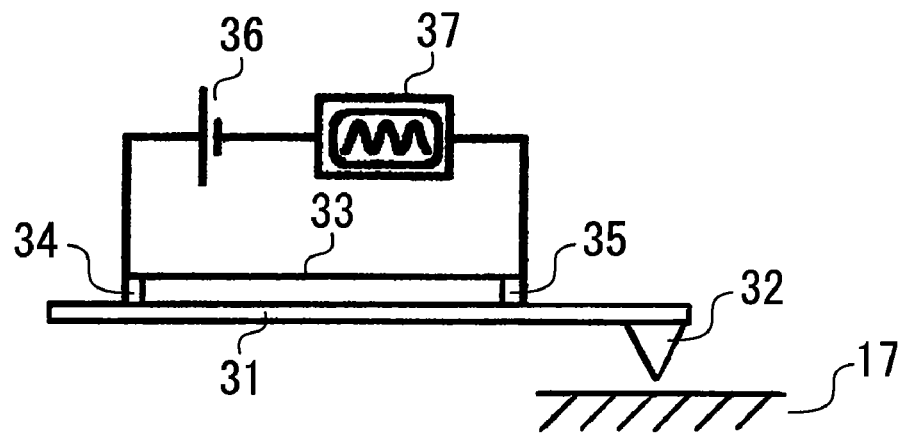
FIG. 8 schematically illustrates a CDW quantum phase microscope as a second embodiment of the present invention.

The CDW quantum phase microscope uses a probe 32 made of Si or the like and installed below one end of a cantilever 31 as shown in FIG. 8. The other end of the cantilever 31 is installed to a piezoelectric controller (not shown). A CDW needle-like crystal 33 is provided integrally on the cantilever 31. Electrodes 34 and 35 are provided at both ends, respectively, of the CWD needle-like crystal 33, and an external circuit including a power source 36 and frequency meter 37 is connected between the electrodes 34 and 35. The frequency meter 37 can be used to measure the frequency of NBS, and a change in threshold electric field of the CDW needle-like crystal 33 be measured based on the measured NBS frequency.

The above CDW quantum phase microscope is to be used as will be discussed below. It should be noted here that the microscope is used to inspect a specimen made of a CDW nano-structure as an example.

The probe 32 is scanned over the surface of a specimen 17 made of the CDW nano-structure while being kept in contact with the specimen surface as shown in FIG. 8. When the probe 32 is brought into contact with the surface of the specimen 17, the tip of the probe 32 is displaced and the one end of the cantilever 31 is thus displaced, which causes the CDW needle-like crystal 33 on the cantilever 31 to expand and contract, which will cause a stress to develop in the CDW needle-like crystal 33. The stress will cause the threshold electric field of the CDW needle-like crystal 33 to change, which will cause the frequency of NBS flowing through the CDW needle-like crystal 33 to change. And the change of the NBS frequency is converted into a surface image.

The above second embodiment is similar to the aforementioned first embodiment except for respects other than the above-mentioned ones.

The second embodiment has similar advantages to those of the first embodiment.

Figure 9:
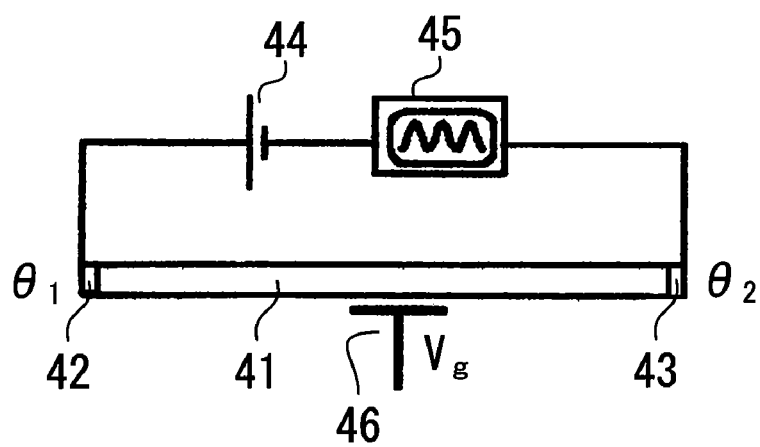
FIG. 9 schematically illustrates a CDW quantum interferometer as a third embodiment of the present invention.

Next, there will be explained the CDW quantum interferometer as the third embodiment of the present invention. FIG. 9 schematically illustrates the CDW quantum interferometer.

The CDW quantum interferometer includes a CDW needle-like crystal 41, electrodes 42 and 43 provided at both ends, respectively, of the CDW needle-like crystal 41 and an external circuit composed of a power source 44 and frequency meter 45 and connected between the electrodes 42 and 43 as shown in FIG. 9. On the central side surface of the CDW needle-like crystal 41, there is provided a gate electrode 46 which can apply a gate voltage to the CDW needle-like crystal 41. The frequency meter 45 can be used to measure the frequency of NBS, and a change in threshold electric field of the needle-like crystal 41 be measured based on the measured NBS frequency.

The CDW quantum interferometer is to be used as will be discussed below:

Since the CDW needle-like crystal 41 is high in purity and extremely small, it depends upon the tradeoff between the wavelength $\lambda_{CDW}$ of CDW and length of the CDW needle-like crystal 41 whether the pinning forces at both ends, respectively, of the CDW needle-like crystal 41 increase or decrease each other. It is assumed here that the phase of CDW at one end, at the side of the electrode 42, of the CDW needle-like crystal 41 is $\theta_1$ and that of CDW at the other end, at the side of the electrode 43, is $\theta_2$. When the gate electrode 46 applies a gate voltage $V_g$ to the CDW needle-like crystal 41, the wavelength $\lambda_{CDW}$ of CDW changes, so that the value $\theta_1 - \theta_2$ will change ($V_g \propto \theta_1 - \theta_2$) and the threshold electric field will change correspondingly to a threshold voltage $V_{th}$. The threshold voltage is given by the following equation:

$$V_{th} = 2V_0 |\cos(\pi C_g V_g / 2e)|$$

where $V_0$ is a constant, $C_g$ is a gate capacitance, and e is an elementary charge. By detecting the change in threshold electric field through measurement of the frequency of NBS, it is possible to measure a local electric field.

According to the third embodiment, there can be implemented a CDW quantum interferometer which actively utilizes macroscopic quantum phase information on CDW. The CDW quantum interferometer can measure the local electric field with a high precision.

Next, there will be explained the magnetic probe microscope as the fourth embodiment of the present invention.

The magnetic probe microscope uses a ferromagnetic material-made probe 12 prepared like the first embodiment. More particularly, for example, a Ni film is formed on the surface of the cone 21 and an electron beam 23 is irradiated to the Ni film as in the first embodiment to grow a needle-like crystal of Ni. This needle-like crystal is used to form the probe 12.

The above fourth embodiment is similar to the aforementioned first embodiment except for respects other than the above-mentioned ones.

According to the fourth embodiment, there can be implemented a magnetic probe microscope using an exellent probe 12 formed from a ferromagnetic material. This magnetic material probe microscope can be used to inspect a ferromagnetic material with a high precision.

Next, there will be explained the diamagnetic probe microscope as the fifth embodiment of the present invention.

The diamagnetic probe microscope uses a diamagnetic material-made probe 12 prepared like the first embodiment. More particularly, for example, a Cu film is formed on the surface of the cone 21 and an electron beam 23 is irradiated to the Cu film as in the first embodiment to grow a needle-like crystal of Cu. This needle-like crystal is used to form the probe 12.

The above fifth embodiment is similar to the aforementioned first embodiment except for respects other than the above-mentioned ones.

According to the fifth embodiment, it is possible to implement a diamagnetic probe microscope using an excellent probe 12 formed from a diamagnetic material. This diamagnetic probe microscope can be used to inspect a diamagnetic material with a high precision.

Next, there will be explained the multi-probe CDW quantum phase microscope as the sixth embodiment of the present invention.

Figure 10:
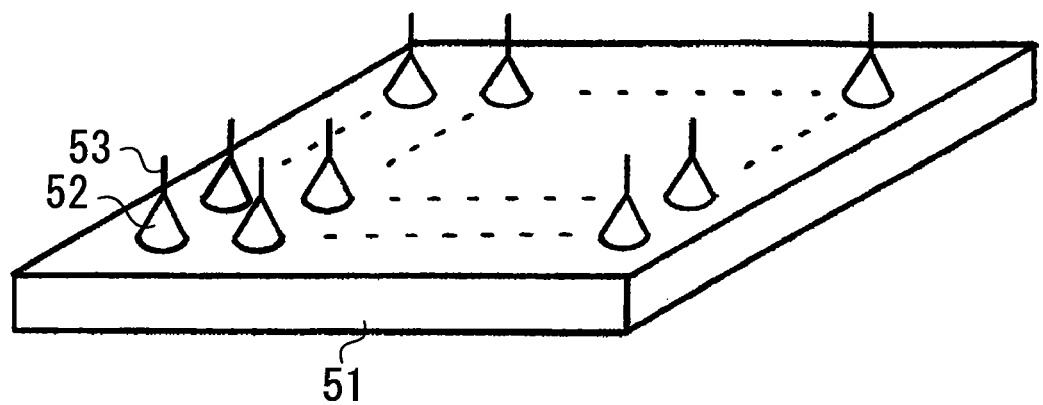
FIG. 10 schematically illustrates a multi-probe CDW quantum phase microscope as a fourth embodiment of the present invention.

As shown in FIG. 10, the multi-probe CDW quantum phase microscope uses a probe 53 prepared by forming multiple cones 52 in a two-dimensional array on a substrate 51 and growing a CDW needle-like crystal on the tip of each cone 52 in the similar manner to that adopted to make the probe as the first embodiment.

The above sixth embodiment is similar to the aforementioned first embodiment except for respects other than the above-mentioned ones.

The multi-probe CDW quantum phase microscope according to the sixth embodiment can be used to inspect a wide range of a CDW specimen with a high precision.

Next, there will be explained the multi-probe CDW quantum phase microscope as the seventh embodiment of the present invention.

Figure 11:
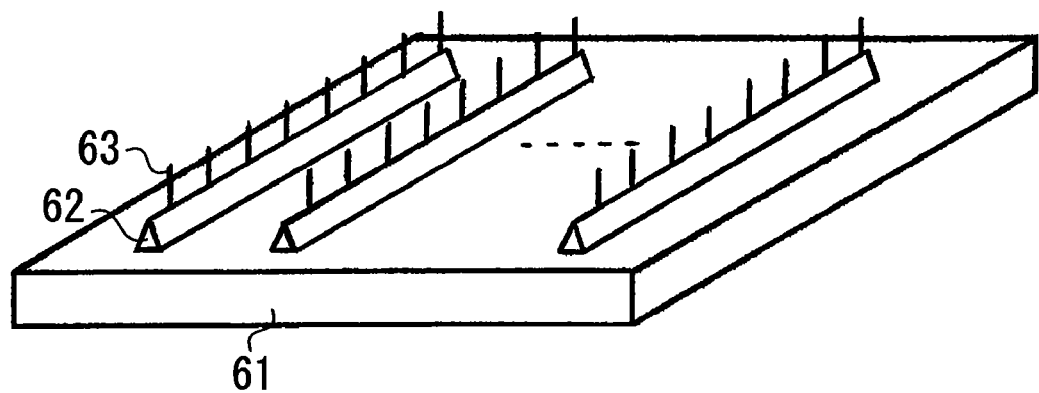
FIG. 11 schematically illustrates a CDW quantum phase microscope as a fifth embodiment of the present invention.

In the multi-probe CDW quantum phase microscope, multiple blade-shaped portions 62 are formed like stripes in parallel with each other on a substrate 61 and probes 63 are formed in a one-dimensional array on the tip of each blade-shaped portion 62 as shown in FIG. 11. The general view of the plurality of blade-shaped portions 62 is such that the probes 63 are disposed in a two-dimensional array. Each of the probes 63 is formed by irradiating an electron beam 23 to a point on the substrate 61 apart from the tip of the blade-shaped portion 62 as in the first embodiment.

The above seventh embodiment is similar to the aforementioned first embodiment except for respects other than the above-mentioned ones.

The multi-probe CDW quantum phase microscope as the seventh embodiment can be used to inspect a wide range of a CDW specimen collectively and with a high precision.

Next, there will be explained the semiconductor device manufacturing method as the eighth embodiment of the present invention.

Figure 12:
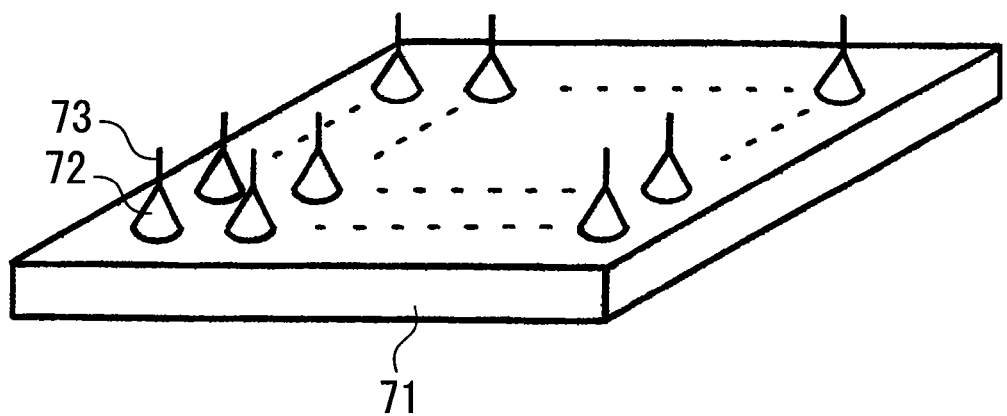
FIG. 12 is a perspective view showing a semiconductor device manufacturing method as an eighth embodiment of the present invention.

According to the eighth embodiment, multiple cones 72 are formed in a two-dimensional array on a n-type GaAs substrate 71, for example, and a needle-like semiconductor crystal 73 of n-type GaAs, for example, is formed on the tip of each of the cones 72 in the similar manner to that adopted to produce the first embodiment, as shown in FIG. 12.

Figure 13:
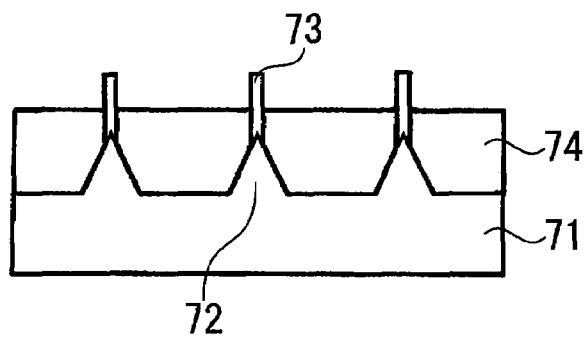
FIGS. 13A to 13D are sectional views showing the semiconductor device manufacturing method as the eighth embodiment of the present invention.
Figure 13:
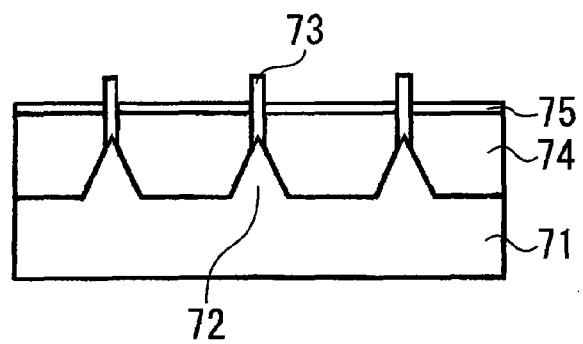

Next, an insulating film 74 like an $SiO_2$ film, for example, is formed on the n-type GaAs substrate 71 up to nearly a half of the height of the needle-like semiconductor crystal 73 as shown in FIG. 13A.

Next, a Schottky electrode material is formed to bury around the needle-like semiconductor crystal 73 on the insulating film 74 to form a gate electrode 75 as shown in FIG. 13B.

Figure 13C:
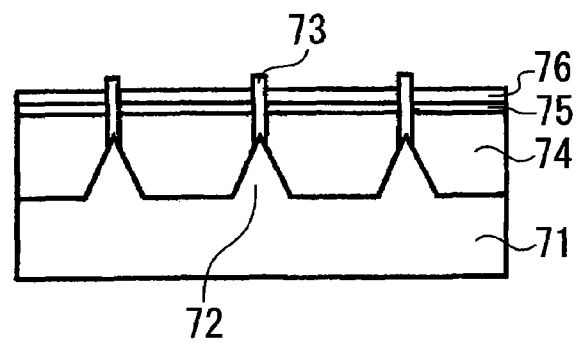
Figure 13:
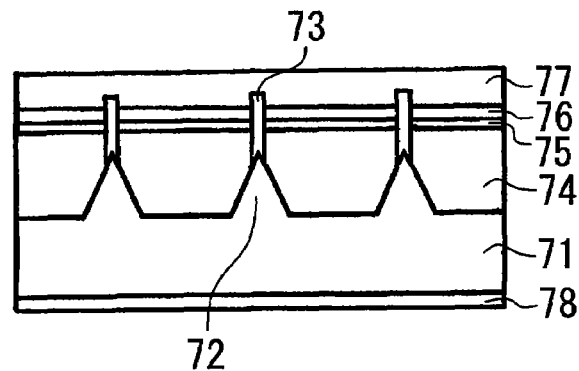

Next, an insulating film 76 of $SiO_2$, for example, is formed on the gate electrode 75 to bury up to a height a little smaller than that of the upper end of the needle-like semiconductor crystal 73 as shown in FIG. 13C.

Then, an ohmic electrode material is formed on the insulating layer 76 to form a drain electrode 77 which is in ohmic contact with the upper end of the needle-like semiconductor crystal 73 as shown in FIG. 13D. On the other hand, the ohmic electrode material is formed on the rear side of the n-type GaAs substrate 71 to form a source electrode 78.

With the above processes, a Schottky gate FET is formed.

According to the eighth embodiment, an integrated FET in which micro Schottky gate FETs formed from the needle-like semiconductor crystal 73 are disposed in a two-dimensional array can easily be produced without use of lithography except in the process of forming the cones 72.

Next, the semiconductor device manufacturing method according to the ninth embodiment of the present invention will be explained.

Figure 14:
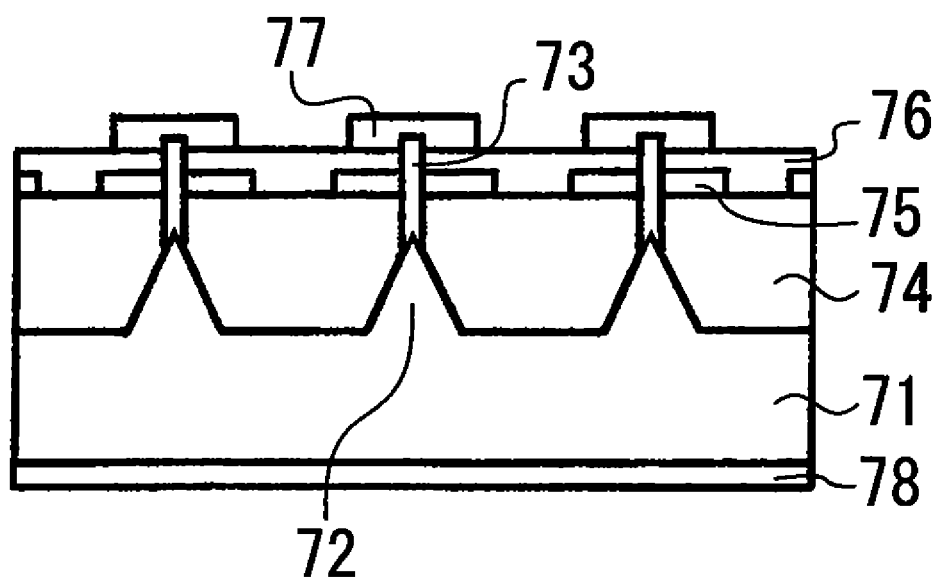
FIG. 14 is a sectional view showing a semiconductor device manufacturing method as a ninth embodiment of the present invention.

According to the ninth embodiment, the gate electrodes 75 and drain electrodes 77 are patterned on each FET as shown in FIG. 14. The gate electrodes 75 are connected to each other by predetermined wiring (not shown) and also the drain electrodes 77 are connected to each other by predetermined wiring (not shown). In this case, FETs can be driven independently of each other.

Figure 15:
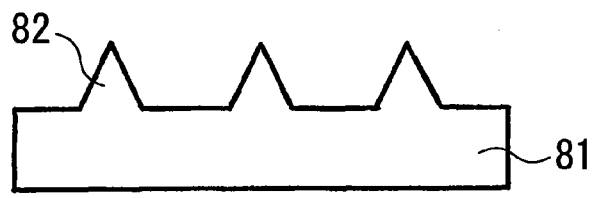
FIGS. 15A to 15C are sectional views showing a quantum dot array manufacturing method as a tenth embodiment of the present invention.
Figure 15:
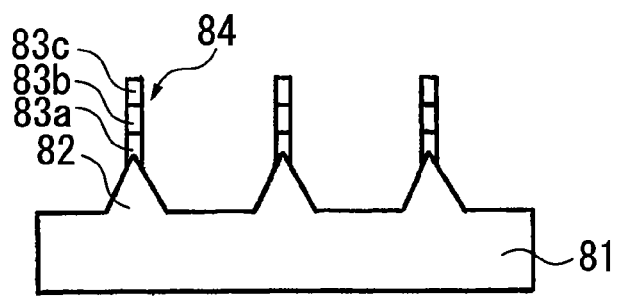
Figure 15:
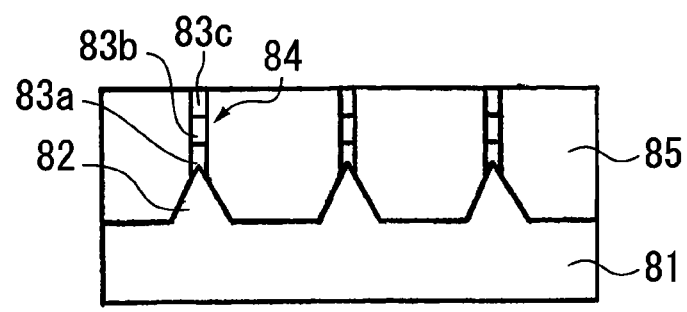

The quantum dot array manufacturing method as the tenth embodiment of the present invention will be explained below:

According to the tenth embodiment, the multiple cones 82 are first formed in the two-dimensional array on the GaAs substrate 81, for example, as shown in FIG. 15A.

Next, a needle-like semiconductor crystal 84 consisting of an AlGaAs layer 83a, GaAs layer 83b and AlGaAs layer 83c is formed on the tip of each cone 82 in the similar manner to that adopted in producing the first embodiment, as shown in FIG. 15B.

Then, an AlGaAs layer 85 is epitaxially grown to fill the spaces between the needle-like semiconductor crystals 84 as shown in FIG. 15C. Thus, there will be formed a structure in which the GaAs layer 83b as a well layer is surrounded by the AlGaAs layer 83a, AlGaAs layers 83c and AlGaAs layer 85 as barrier layers, that is, an AlGaAs/GaAs quantum dot.

According to the tenth embodiment, the two-dimensional quantum dot array can easily be produced.

Next, the eleventh embodiment of the present invention will be explained. According to the eleventh embodiment, the probe 12 made of the CDW needle-like crystal is produced in a manner different from that adopted to produce the first embodiment.

Figure 16:
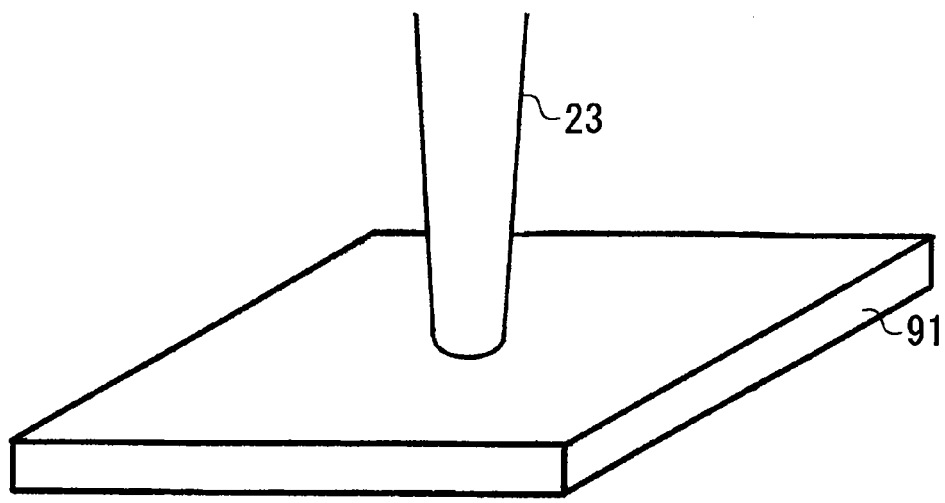
FIGS. 16A and 16B are sectional views showing a probe manufacturing method as an eleventh embodiment of the present invention.
Figure 16:
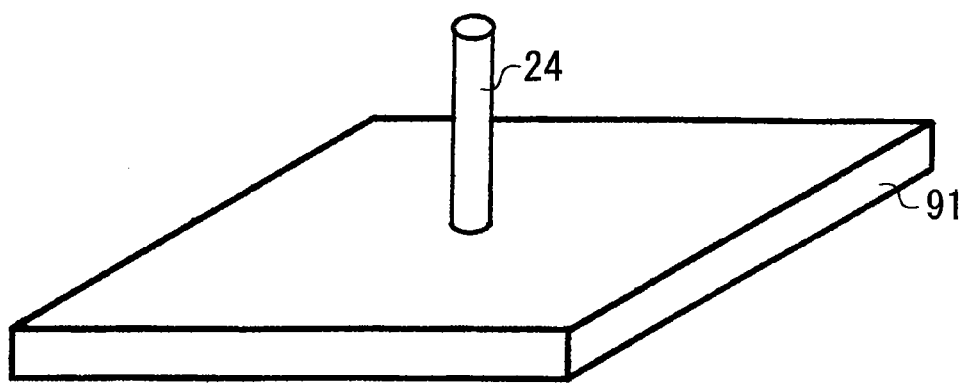

According to the eleventh embodiment, a CDW crystal substrate 91 is first prepared and its surface is irradiated to a predetermined point thereon with an electron beam 23 at room temperature as shown in FIG. 16A. The spot size of the electron beam 23 may be about 50 nm to 1 µm, for example. At this time, the CDW crystal substrate 91 is heated to a temperature nearly equal to its melting point at the point irradiated with the electron beam 23. The CDW crystal substrate 91 thus melted is recrystallized to grow the CDW needle-like crystal 24 as shown in FIG. 16B. The CDW needle-like crystal 24 may be, for example, about 5 nm to 1 µm in thickness (diameter), 10 nm to 2 µm in length or 10 to 500 nm, and 100 or less in aspect ratio (length/thickness) as a rule.

EXAMPLE 2

The electron beam 23 was irradiated to the predetermined point on the surface of the CDW crystal substrate 91 formed from the $TaSe_2$ crystal. The CDW crystal substrate 91 has a square shape of which each side is about 40 µm long. The electron beam 23 was irradiated to a spot of 1 µm in size with an irradiation current of $8 \times 10^{-8}$ A at an acceleration voltage of 25 kV for 30 min. Also, the electron beam 23 was irradiated in a vacuum of 3 to $4 \times 10^6$ Torr. As the result, the CDW needle-like crystal 24 made of the single crystal $TaSe_2$ needle-like crystal (nano-fiber) of about 50 nm in diameter was grown to a length of about 150 nm contiguously with the CDW crystal substrate 91 on the CDW crystal substrate 91 made of the $TaSe_2$ crystal.

According the eleventh embodiment, the CDW needle-like crystal 24 suitable for use in a CDW quantum phase microscope can be provided.

Figure 17:
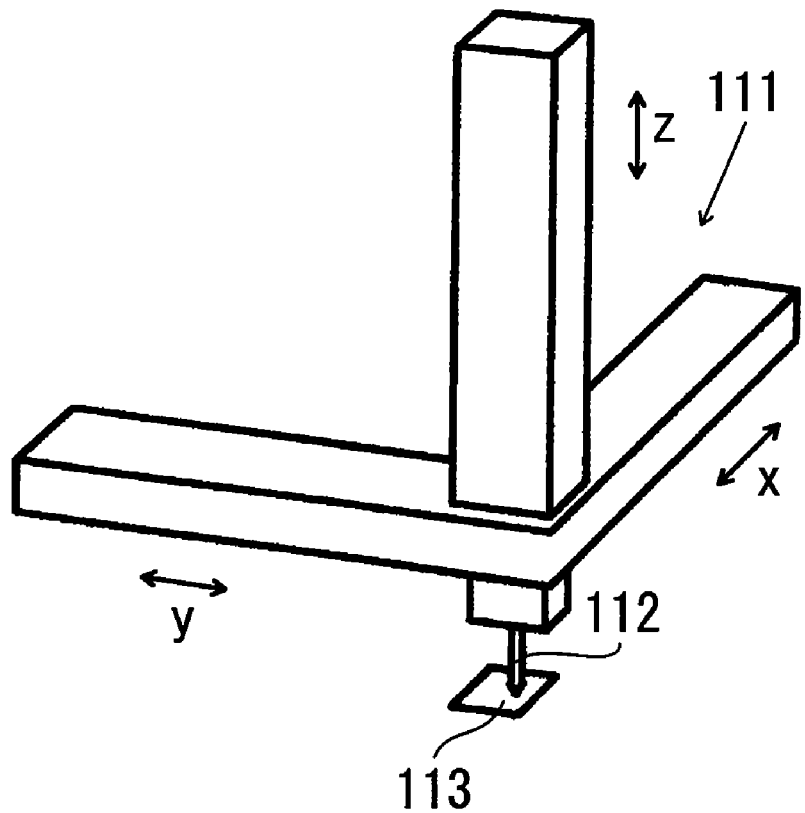
FIG. 17 schematically illustrates an Andreev-reflection scanning probe microscope as a twelfth embodiment of the present invention.

The Andreev-reflection scanning probe microscope according to the twelfth embodiment of the present invention is to be used as will be discussed below:

Referring now to FIG. 17, there is schematically illustrated the Andreev-reflection scanning probe microscope as the twelfth embodiment.

The Andreev-reflection scanning probe microscope includes a piezoelectric controller 111 similar to that used in the ordinary scanning probe microscope, and a LBCO probe 112 made of an $La_{2-x}Ba_xCuO_4$ (LBCO) (where x=⅛) needle-like crystal and provided under the piezoelectric controller 111. The piezoelectric controller 111 can operate to scan the LBCO probe 112 three-dimensionally in the x-, y- and z-directions on a specimen 113.

Figure 18:
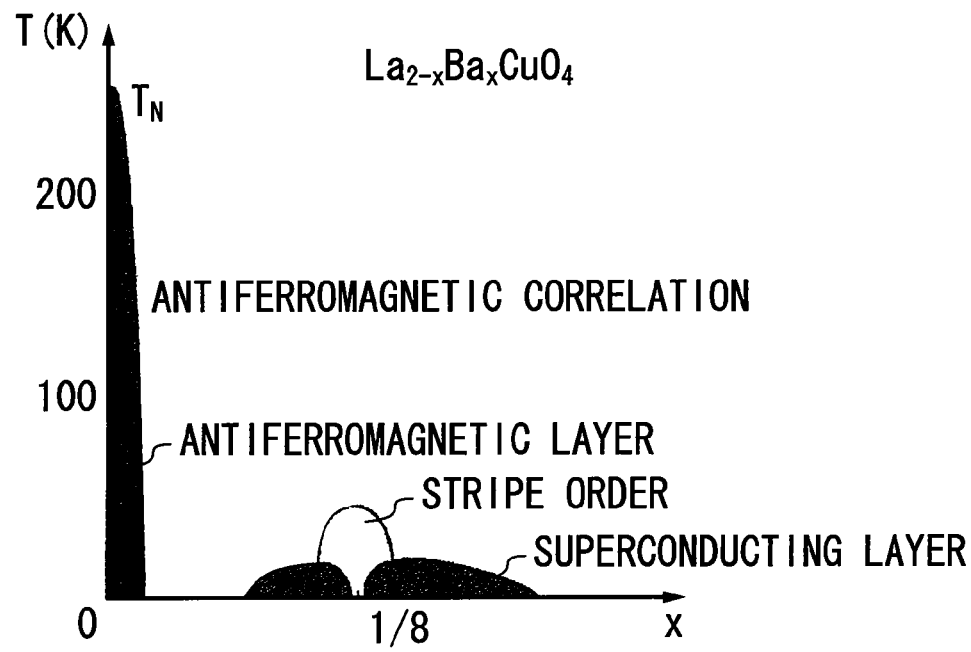
FIG. 18 is a phase diagram of $La_{2-x}Ba_xCuO_4$.
Figure 19:
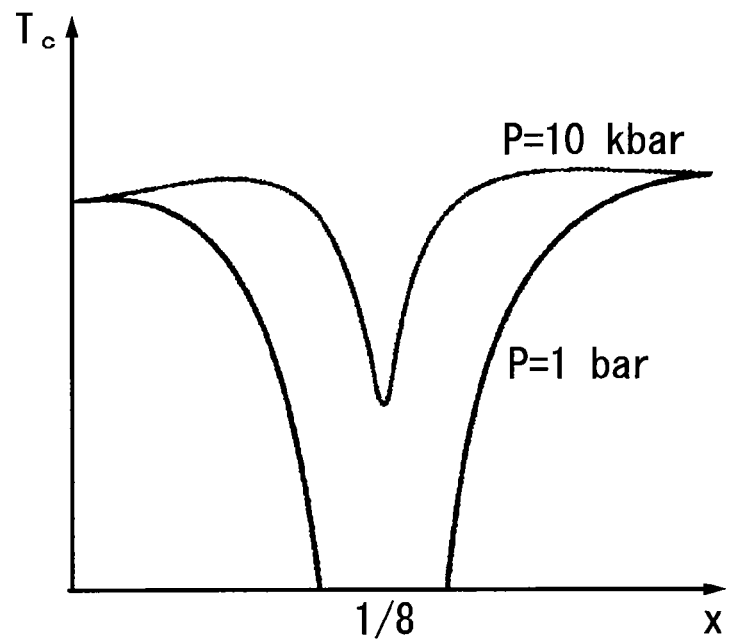
FIG. 19 graphically illustrates the relation between the Ba concentration x of $La_{2-x}Ba_xCuO_4$ and superconducting critical temperature $T_C$ with an applied pressure being taken as a parameter.

The Andreev-reflection scanning probe microscope is to be used as will be discussed below:

FIG. 18 is a phase diagram of $La_{2-x}Ba_xCuO_4$. As shown in FIG. 18, in the vicinity of x=⅛, the spin/charge stripe order is stabilized at a lower temperature so that the system becomes insulative and the superconductivity is inhibited. On the other hand, when a small pressure is applied to the system, the spin/charge stripe order will be inhibited and the superconductivity be recovered as shown in FIG. 19. In this case, on the assumption that the superconducting critical temperature is $T_c$ and applied pressure is P, the pressure coefficient of $T_c$, $dT_c/dP$, will be −3 K/kbar, which is 2 or 3 orders of magnitude higher than that of the conventional superconductor. Thus, just application of a weight of about 0.1 μgw to the LBCO probe 112 having a tip of several nanometers in diameter permits to implement the probe tip superconductive.

On this account, by bringing the LBCO probe 112 having a superconductivity susceptible to such a pressure into contact with the surface of the specimen 113 so as to apply the tip of the LBCO probe 112 with a pressure higher than the pressure under which the superconductivity is recovered, the tip of the LBCO probe 112 having been insulative becomes superconductive so that the I-V characteristic between the LBCO probe 112 and specimen 113 will be changed due to the Andreev reflection. However, the LBCO probe 112 should be cooled to a temperature lower than the superconducting critical temperature when the pressure is applied and to a temperature higher than the superconducting critical temperature when no pressure is applied.

Figure 20:
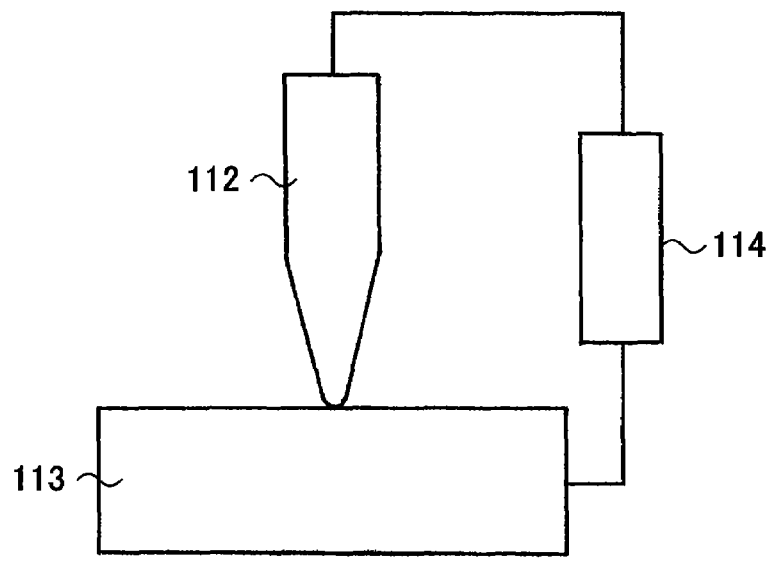
FIG. 20 schematically illustrates how to use of the Andreev-reflection scanning probe microscope as the twelfth embodiment of the present invention.
Figure 21:
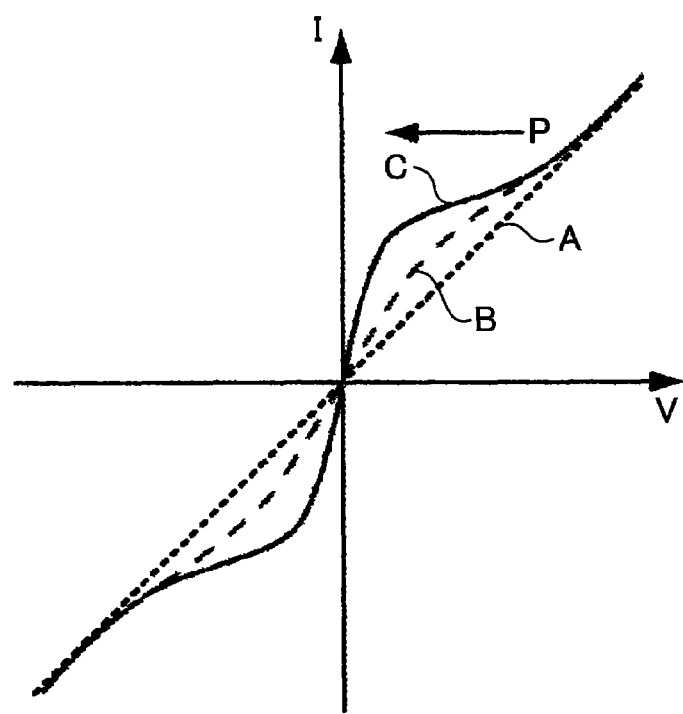
FIG. 21 graphically illustrates the change of I-V characteristic between the probe and specimen, caused by an applied pressure, in the Andreev-reflection scanning probe microscope as the twelfth embodiment of the present invention.

The above I-V characteristic change can be utilized to make the following measurement, for example:

A first example of the measurement is to image surface irregularities of the specimen 113 by utilizing the I-V characteristic change. More specifically, the LBCO probe 112 is scanned along the surface of the specimen 113 with a constant current being supplied from a constant-current source 114 between the LBCO probe 112 and specimen 113 as shown in FIG. 20. At this time, the tip of the LBCO probe 112 being at a convexity of the specimen surface will be applied with a pressure and have a state of superconductivity, while the tip of the LBCO probe 112 being at a concavity will be applied with no pressure and thus have a state of normal conduction. Namely, the tip of the LBCO probe 112 changes between the states of normal conduction and superconductivity correspondingly to the surface irregularities of the specimen 113, and the voltage between the LBCO probe 112 and specimen 113 changes correspondingly, resulting in a change of the I-V characteristic between the LBCO probe 112 and specimen 113. For example, the I-V curve changes from A, B to C in this order as shown in FIG. 21. By imaging this I-V characteristic change, it is possible to view the surface irregularities of the specimen 113. In this first example, the specimen 113 is not limited to any special one but may be selected from various types.

In a second example of the measurement, the LBCO probe 112 is scanned along the surface of the specimen 113 with the height of the LBCO probe 112 being changed so as to keep constant the voltage between the LBCO probe 112 and specimen 113. In this case, by imaging the change in height of the LBCO probe 112, it is possible to view the surface irregularities of the specimen 113. Also, in this second example, the specimen 113 is not limited to any special one but may be selected from various types.

In a third example of the measurement, the specimen 113 is a superconducting one. In case a superconducting region and non-superconducting region exist together on the surface of the specimen 113 as in case magnetic flux lines have entered the superconducting specimen, the I-V characteristic between the LBCO probe 112 and specimen 113 varies depending upon whether the LBCO probe 112 is in the superconducting region or in the non-superconducting region. Therefore, by imaging the I-V characteristic change, it is possible to view the flux-line lattice of the specimen 113 and superconducting/non-superconducting nonuniform state.

The LBCO probe 112 is produced as will be discussed below:

In one example of the manufacturing method, a bulk LBCO crystal is processed to prepare the LBCO probe 112.

In another example of the manufacturing method, the LBCO probe 112 is prepared as will be discussed below.

Figure 22:
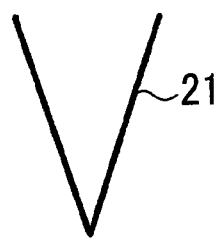
FIGS. 22A to 22D schematically illustrate a manufacturing method for an LBCO probe used in the Andreev-reflection scanning probe microscope as the twelfth embodiment of the present invention.
Figure 22:
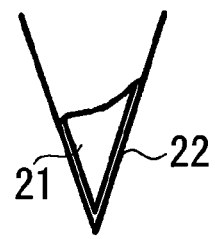
Figure 22:
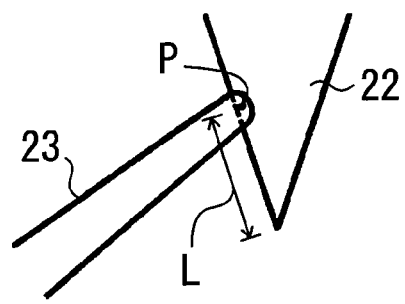
Figure 22:
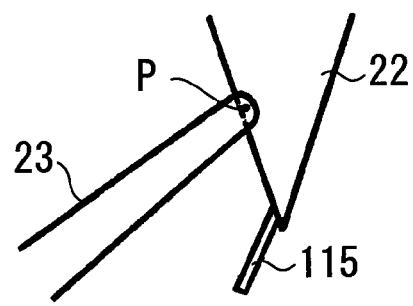

First, a cone 21 is prepared as shown in FIG. 22A. Basically, the cone 21 may be formed from any material having a melting point at which the cone 21 heated by irradiating an electron beam to grow the LBCO needle-like crystal as will be described later will not be softened, for example, a melting point of 800° C. or higher. More specifically, the cone 21 may be formed from Si, $Si_3N_4$, $SiO_2$, diamond, alumina (sapphire), $TaS_2$, GaAs, Ni, Ta or the like.

Next, a raw-material film 22 for a LBCO crystal which is to be grown is formed on the surface of the cone 21 in vacuum as shown in FIG. 22B. The raw-material film 22 may be, for example, a La film or $La_2O_3$ film, Ba film or BaO film, Cu film or $Cu_2O$ film or a LBCO film itself. The raw-material film 22 may be formed by any one of the deposition methods such as the vacuum evaporation, sputtering, CVD, MOCVD, MBE and the like or by an appropriate combination of these methods.

Next, an electron beam 23 is irradiated toward a point P on the cone 21 at a distance L of about 1 to 3 μm along the side surface of the cone 21 from the tip of the cone 21 having the raw-material film 22 formed thereon as shown in FIG. 22C. The electron beam 23 is irradiated to a spot of about 50 nm to 1 μm in size with an irradiation current of $1×10^{-7}$ μA at an acceleration voltage of 25 to 200 kV for 30 min. to 1 hour. Also, the electron beam 23 is irradiated in a vacuum of 3 to $4×10^{-6}$ Torr, for example. At this time, a LBCO needle-like crystal 115 grows in the vicinity of the tip of the cone 21, not at a point irradiated with the electron beam 23, as shown in FIG. 22D. Normally, when the electron beam 23 is irradiated, a temperature gradient of 10 to 100° C./μm starting at the cone tip (at the lowest temperature) takes place between the point irradiated with the electron beam 23 and point where the LBCO needle-like crystal 115 grows. In this case, the temperature of the point irradiated with the electron beam 23 is higher than the growth temperature of the LBCO needle-like crystal 115, but the point where the LBCO needle-like crystal 115 grows has a temperature optimum for the growth of the LBCO needle-like crystal 115. It is considered that the LBCO needle-like crystal 115 is grown due to the solid-phase epitaxial growth. The LBCO needle-like crystal 115 is, for example, about 5 nm to 1 μm in thickness (diameter), 10 nm to 2 μm or 10 to 500 nm in length, and 100 or less in aspect ratio (length/thickness) as a rule.

According to the twelfth embodiment, it is possible to implement a scanning probe microscope very useful for viewing an image of irregularities of the surface of a specimen, studying the nano-scale nonuniformity superconducting state (phenomenon of self-organization) taking place in a high-temperature superconductor and heavy electron system, viewing the flux-line lattice and for studying the state of electrons within magnetic flux lines, as having been described in the foregoing.

In the foregoing, the present invention has been described in detail concerning certain preferred embodiments and examples. However, it should be understood by those ordinarily skilled in the art that the present invention is not limited to the embodiments and examples but can be modified in various manners, constructed alternatively or embodied in various other forms without departing from the scope and spirit thereof.

For example, the numerical values, constructions, materials, raw materials, processes, etc. having been described concerning the embodiments and examples are just examples and the present invention can be embodied using numerical values, constructions, materials, raw materials, processes, etc. different from the above as necessary.

Also, another energy beam such as a laser beam, ion beam or the like may be used instead of the electron beam 23. Also, a raw material being supplied may be irradiated with the electron beam 23 to grow the needle-like crystal, not with the raw-material film 22 pre-formed before irradiation of the electron beam 23. Further, with one raw material having been formed, the electron beam 23 may be irradiated to another raw material to grow the needle-like crystal.

The present invention can provide a probe microscope such as the charge density wave quantum phase microscope capable of analyzing the charge density wave nano-structure and determining a biomolecular structure with a high precision by actively utilizing macroscopic quantum phase information on the charge density wave, and which can be designed small. Also, the present invention provides an electronic device such as a micro semiconductor device without use of any lithography.

Also, the present invention can provide a charge density wave quantum phase microscope capable of analyzing the charge density wave nano-structure and determining a biomolecular structure with a high precision by actively utilizing macroscopic quantum phase information on the charge density wave, and which can be designed small.

Also, the present invention can provide a charge density wave quantum interferometer capable of measuring a local electric field with a high precision by actively utilizing macroscopic quantum phase information on the charge density wave.

Also, the present invention can provide a scanning probe microscope which is extremely effective for study of the nano-scale nonuniform superconducting state, observation of a flux-line lattice, study of the state of electrons within a magnetic flux and observation of an image of specimen surface irregularities.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A charge density wave quantum phase microscope comprising a probe formed from a charge density wave crystal, and wherein a change in threshold electric field of the charge density wave crystal, caused when the probe is brought into contact with a specimen, is measured through measurement of the frequency of a narrow band signal.

2. A charge density wave quantum interferometer comprising a needle-like crystal formed from a charge density wave crystal.

* * * * *